April 14, 1936.   A. H. GOEPEL ET AL   2,037,625
TRAP JOINT AND DRAIN OUTLET
Filed Nov. 17, 1934
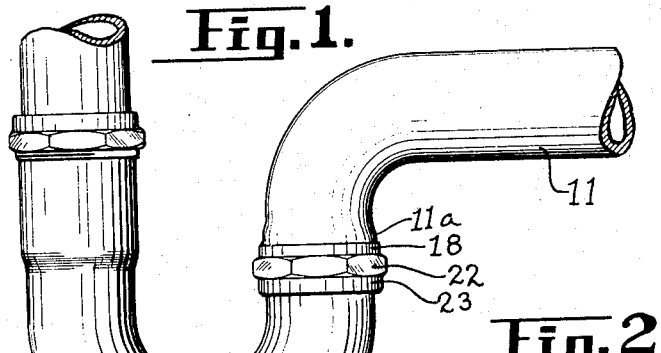
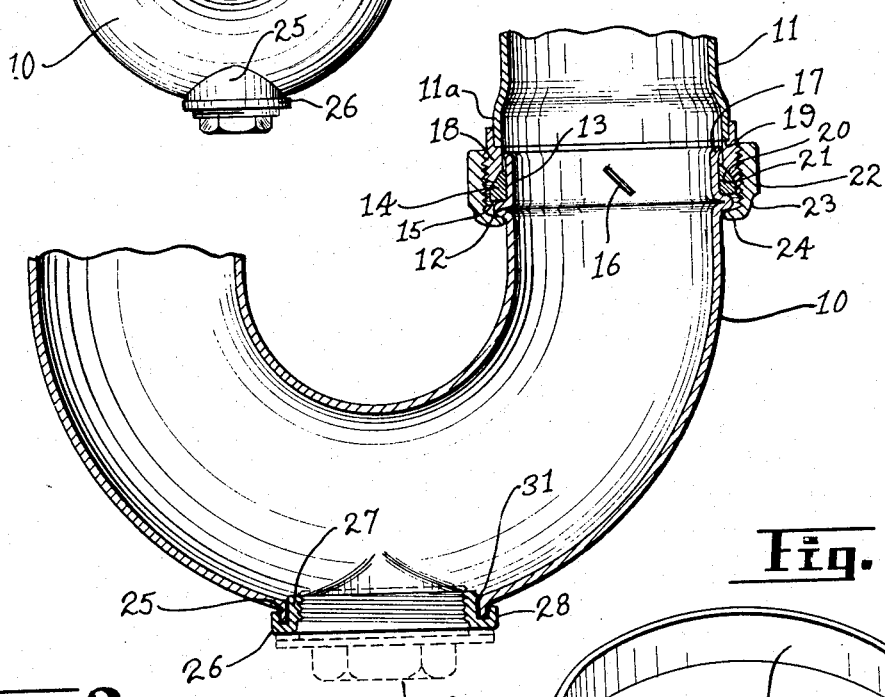
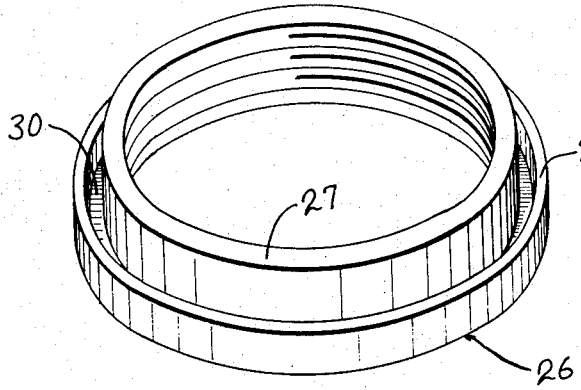
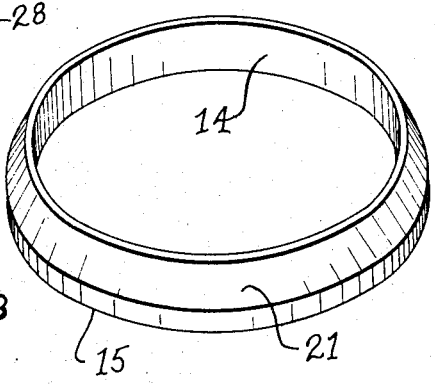
INVENTORS
Arthur H. Goepel.
BY Patrick F. Donahue.
ATTORNEY Patented Apr. 14, 1936

2,037,625

UNITED STATES PATENT OFFICE 2,037,625

TRAP JOINT AND DRAIN OUTLET

Arthur H. Goepel and Patrick F. Donahue, Waterbury, Conn., assignors to Scovill Manufacturing Company, Waterbury, Conn., a corporation of Connecticut Application November 17, 1934, Serial No. 753,468

2 Claims. (Cl. 285—122)

This invention relates to pipe fittings, and more particularly to an improved coupling for joining the ends of two pipes, such as are used in traps, wastes, overflows, wall piping, floor tubes, supply fittings, etc.

One object of this invention is to provide a pipe coupling of the above nature in which the union between the pipes is effected by a metal-to-metal contact of a soft metal packing ring and a hard metal bushing, thus avoiding the disadvantages of former types of couplings employing leather or rubber washers which quickly deteriorated and were often destroyed when uncoupling and coupling the joint.

A further object is to provide an improved form of clean-out bushing adapted to be fitted to the outlet of a J-trap bend, said bushing having a U-shaped channel ring which is adapted to loosely embrace a tubular flange depending from said J-bend, and is rigidly secured thereto by a U-shaped bond of solder.

A further object is to provide a trap joint of the above nature which will be simple in construction, inexpensive to manufacture, easy to install and manipulate, compact, and very efficient and durable in use.

With these and other objects in view, there has been illustrated on the accompanying drawing, one form in which the invention may be conveniently embodied in practice.

In the drawing:

Fig. 1 represents a side elevation of a P type of trap connection embodying the invention.

Fig. 2 is a vertical sectional view of the same.

Fig. 3 is an enlarged detailed perspective of the "clean-out" bushing located in the bottom of the J-bend.

Fig. 4 is an enlarged detailed perspective view of the soft metal packing ring or washer used in the pipe connection.

Referring now to the drawing in which like reference numerals denote corresponding parts throughout the several views, the numeral 10 indicates a J-bend, such as used in lavatory or sink traps, and the numeral 11 indicates a horizontal wall pipe which is adapted to be joined to the J bend 10 by the improved coupling construction forming the subject of the present invention.

The upper end of the short section of the J bend 10 is provided with an annular bead or flange 12 formed outwardly from the metal wall thereof a short distance below said end, and a cylindrical neck 13 being provided above said bead. The neck 13 is adapted to be surrounded by a soft metal packing ring or washer 14, preferably of lead, having a horizontal lower end 15 which is adapted to seat upon the bead 12.

In order to prevent the lead packing washer 14 from twisting or sliding upwardly, the neck 13 may be provided with one or more inclined ribs 16, formed outwardly from said neck and adapted to bite into the soft metal of said washer 14, and anchor it securely in position. The lead washer 14 is additionally locked against sliding upwardly on the neck 13 by spinning or peening outwardly the upper edge of said neck to form a flared flange 17.

The lower end of the wall pipe 11 is offset outwardly to form a bell-mouth 11a, and is adapted to receive a short tubular bushing 18 having an interior annular shoulder 19 which is adapted to abut against the corresponding annular end of the bell-mouth 11a. The bushing 18 is securely connected to the wall pipe 11, as by soldering.

The lower end of the bushing 18 is provided on its inner edge with a beveled surface 20 which is adapted to fit snugly against a cooperating beveled section 21 formed on the upper end of the lead packing ring 14. The bushing 18 and the metal washer 14 are adapted to be drawn tightly together by means of a coupling nut 22, the lower end 23 of which is bent inwardly to provide a flange 24 which is adapted to rotatably engage the underside of the annular bead 12. The coupling nut 22 is provided with interior threads for engaging corresponding exterior threads on the bushing 18, thereby compressing the lead washer inwardly upon the neck 13 to prevent leakage therebetween.

In assembling the coupling nut 22, it will be obvious that there will be no tendency to pull the tubular bushing 18 away from the pipe 11. Moreover, a thoroughly leak-tight seal will be provided which will not be injured by the removal or replacement of the coupling nut.

Clean-out bushing

In order to provide an improved form of non-leak outlet construction at the clean-out hole of the J bend trap 10, the bottom of said J bend is provided with a depending vertical circular flange 25 adapted to fit loosely within a circular bushing member 26 of U-shaped cross-section, and adapted to be hermetically sealed to said flange 25 by means of solder filling the space therebetween. The inner portion 27 of the U-shaped bushing 26 is longer than the exterior portion 28 thereof, and said portion 27 is threaded to receive a drain plug 29 adapted to close the clean-out hole of the trap.

As best shown in Figs. 2 and 3, the annular channel 30 formed in the U-shaped bushing member 26 is of such a size relative to the depending circular flange 25 as to provide a slight clearance therebetween.

To assemble the clean-out bushing, the J bend 10 will be placed upon the bushing 26 with the flange 25 loosely seated in the channel 30. The bushing and flange will then be heated to soldering temperature with a blow-torch or otherwise, and solder 31 will be deposited as by a soldering iron in the channel 30 in sufficient quantity to completely fill the space between the bushing 26 and flange 25. By this construction, it will be seen that the area of the soldered seal is greatly increased over that commonly employed.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a coupling connection for joining the ends of two pipes, one of said pipes having an exteriorly threaded end section, the other pipe having an exterior rim adjacent the end thereof, a soft metal packing washer surrounding said other pipe and seated on said rim, means on said other pipe for anchoring said washer against longitudinal or rotational movement, and a coupling nut engaging under said rim and screwed upon the threaded section of said first pipe, said anchoring means comprising a lug on the exterior of said other pipe.

2. In a coupling connection for joining the ends of two pipes, one of said pipes having an exteriorly threaded end section, the other pipe having an exterior rim adjacent the end thereof, a soft metal packing washer surrounding said other pipe and seated on said rim, means on said other pipe for anchoring said washer against longitudinal or rotational movement, and a coupling nut engaging under said rim and screwed upon the threaded section of said first pipe, said anchoring means comprising a plurality of inclined lugs on the exterior of said other pipe and embedded in said washer.

ARTHUR H. GOEPEL.
PATRICK F. DONAHUE.